3,657,140
CERIUM ACTIVATED SOLID SOLUTION YTTRIUM GALLIUM OXIDE PHOSPHOR

Edward F. Gibbons, 450 Yorkshire Blvd., Dearborn Heights, Mich. 48127; and Douglas E. Smith, 524 3rd St. 48123; and Tseng Y. Tien, 660 Archwood Drive 48103, both of Ann Arbor, Mich.
No Drawing. Filed May 26, 1970, Ser. No. 40,747
Int. Cl. C09k 1/68
U.S. Cl. 252—301.4 R      6 Claims

ABSTRACT OF THE DISCLOSURE

A solid solution of yttrium aluminum oxide and yttrium gallium oxide with a small amount of cerium ion emits bright yellow light when excited by cathode rays. The phosphor is easily manufactured in the form of a fine uniformly divided powder that has a high resolution and a decay time of less than about 70 nanoseconds.

SUMMARY OF THE INVENTION

Automatic address readers being developed for the United States Postal System utilize a flying spot scanner to read the zip code number from envelopes. The data from the scanner is applied to a comparator that automatically routes the letter into an appropriate receptacle. A typical flying spot scanner is a cathode ray tube having a screen that has been coated with a phosphor on which a highly focused electron beam produces a very small, well defined spot of illuminescence. The light from the screen is focused on an envelope and a photo multiplier tube records the change in reflection from the envelope as the light beam scans across the zip code characters on the envelope.

Phosphors for flying spot scanners preferably emit bright yellow light to produce a sharp contrast between blue or black ink on white or yellow envelopes, decay quickly after excitation so the scanner can move on to the next character, operate with high efficiency and are finely divided to enhance the resolution of the scanner. Commercially available phosphors typically emitted light over a relatively broad spectrum and usually peaked within the green or greenish yellow portion thereof. The prior art phosphors also suffered from relatively slow decay rates of about 100 nanoseconds and required high input energies to achieve satisfactory brightness. In addition, the prior art phosphors usually were elongated particles that could not be deposited uniformly on the face of the cathode ray tube and thus resulted in wide variations in resolution.

This invention provides a cathodoluminescent phosphor that emits light having a relatively narrow spectrum with a peak in the yellow portion, decays in about 70 nanoseconds or less, and operates with about twice the efficiency of prior art phosphors. The phosphor consists essentially of a solid solution of yttrium aluminum oxide, yttrium gallium oxide and cerium ion having the formula $$Y_{3-p}Ce_pAl_{5-q}Ga_qO_{12}$$

where $p$ is between about 0.03 and 0.50 and $q$ is between about 0.01 and 1.00. In the phosphor, cerium ions are substituted for some of the yttrium and gallium ions are substituted for some of the aluminum. Adjusting the values of $p$ and $q$ produces phosphors having differing emission peaks without significantly affecting other properties. Phosphors of the invention can be produced with emission peaks ranging from about 5300 to 5800 angstrom units. Half maximum values of the emissions, which is the wave length at which emissions have one half of the peak intensity, generally are within about 600 angstrom units of the peak wave length.

A preferred phosphor that is produced when $p$ is 0.15 and $q$ is 0.25 has the formula $Y_{2.85}Ce_{0.15}Al_{4.75}Ga_{0.25}O_{12}$. When activated with a cathode ray beam, this composition emits light having a peak at 5650 angstroms and a decay time of less than 70 nanoseconds. The emitted light has half maximum values at 5140 angstrom units and 6270 angstrom units.

Any of the phosphors with the above general composition can be manufactured in the form of a fine, uniform powder. Such powders are particularly useful because they provide high resolution when used in flying spot scanners. The light emission of the phosphors decays to 1/e (about 37 percent) of its original intensity in 70 nanoseconds or less, and continues to decay at the same exponential rate to negligible values at which flying spot scanner equipment does not produce any spurious noise. Such negligible values typically are less than one percent of activated intensity. Refiring the chemically formed phosphors reduces significantly any afterglow characteristics. Phosphors in which $p$ is between about 0.09 and 0.3 and $q$ is between about 0.01 and 0.75 emit light having peaks within a range of 5500–5750 angstroms and an excellent combination of high efficiency, rapid decay time and negligible afterflow.

Efficiency as used in this specification is the amount of light emitted by a phosphor divided by the amount of electrons used to excite the phosphor. Absolute values of efficiency are difficult to measure, but comparative values based on the brightness of the emitted light show that the phosphors of this invention have efficiencies about 100 percent greater than phosphors commercially available for use in flying spot scanners.

Phosphors of this invention are made in the form of a finely divided powder by preparing dilute aqueous solutions of salts of the metals in appropriate proportions. The solutions typically are about 0.1 molar, but concentrations up to the respective solubility limits can be used. Nitrate or chloride salts of the metals are easy to handle and readily soluble in water, and are therefore preferred.

After intimately mixing the aqueous solutions, the salts of the metals are coprecipitated by slowly dripping the mixed solution into a buffered solution and simultaneously adding drops of ammonium hydroxide or some other precipitating reagent. The resulting precipitate is an intimate mixture of hydroxides of the metals. Maintaining the pH of the buffered solution between about 7–7.5 insures coprecipitation of gallium hydroxide. The mixture is stirred constantly during precipitation.

The precipitate is filtered, washed with water and dried by heating to about 150° F. for several hours. After the drying step, the filter cake is placed in alumina boats and fired in a reducing atmosphere for about 16–40 hours at 1300–1400° C. During the firing step, the metal hydroxides are converted to the garnet structure. The material is maintained in the reducing atmosphere until it is cooled to about room temperature.

A fine, uniformly divided powder having an average particle size of less than one micron results. The powder is applied to the face of a cathode ray tube by conventional techniques.

DETAILED DESCRIPTION

Example 1

Aqueous solutions of 0.962 M yttrium nitrate, 0.118 M cerium nitrate, 1.4395 M aluminum chloride, and 0.25 M gallium nitrate are prepared.

A mixture is prepared from 29.5 milliliters of the yttrium solution, 12.75 milliliters of the cerium solution, 45.8 milliliters of the aluminum solution and 10 milliliters of the gallium solution. After intimate mixing, the mixture is dripped slowly into about 100 milliliters of a solution of trihydroxymethylamino-methane buffered with hydrochloric acid to a pH of 7–7.5. Simultaneously, drops of about 0.5 N ammonium hydroxide are added. The additions are monitored continuously with a pH meter to maintain the pH range and the resulting mixture is stirred continuously with a magnetic stirrer.

When addition is complete, the resulting precipitate is removed by filtering and is dried overnight in a circulating air oven at about 150° F. The precipitate is placed in an alumina boat, covered with a reducing atmosphere consisting of 25 percent hydrogen and 75 percent nitrogen, and heated slowly to 1350–1380° C. where it is held for about 40 hours. After cooling, the resulting phosphor is removed from the reducing atmosphere, ground under acetone, and dried. The phosphor has the composition $Y_{2.85}Ce_{0.15}Al_{4.75}Ga_{0.25}O_{12}$. When excited by cathode rays, the phosphor emits light having a peak at 5650 angstroms with half maximum values of 5140 and 6270 angstroms. The phosphor decays to its 1/e intensity in about 70 nanoseconds and continues to decay at approximately the same exponential rate to extremely low values. Repeating the firing step reduces considerably any afterglow of the phosphor. The emission spectrum and other characteristics of this phosphor make it highly suitable for use in flying spot scanners for automatic address readers.

Example 2

A mixture is prepared from 30.3 milliliters of the yttrium solution, 6.35 milliliters of the cerium solution, 45.8 milliliters of the aluminum solution and 10 milliliters of the gallium solution of Example 1. Precipitation and firing are carried out according to the procedure of Example 1 except that firing takes place in 100 percent hydrogen.

The resulting phosphor has the formula $$Y_{2.925}Ce_{0.075}Al_{4.75}Ga_{0.25}O_{12}$$

and emits cathodoluminescence having a peak at 5560 angstroms with half maximums at 5060 and 6235 angstroms. Repeating the refiring step reduces any afterglow tendencies of the phosphor, which decays to its 1/e intensity in about 70 nanoseconds.

Example 3

A mixture is prepared from 25.7 milliliters of the yttrium solution, 44.5 milliliters of the cerium solution, 33 milliliters of the aluminum solution and 10 milliliters of the gallium solution of Example 1. Precipitation and firing are carried out according to Example 2 to produce a phosphor having the formula $$Y_{2.475}Ce_{0.525}Al_{4.75}Ga_{0.25}O_{12}$$

The phosphor emits cathodoluminescence having a peak at 5800 angstroms and half maximums at 5300 and 5380 angstroms. Repeating the firing step significantly reduces the slight afterglow of the phosphor.

Comparative tests revealed that the phosphors of these examples produce light having approximately twice the intensity of commercially available phosphors. Varying the amounts of gallium or cerium within the above ranges changes the emission peaks without significantly affecting the other characteristics.

Thus this invention provides phosphors having properties highly suitable for use in the flying spot scanners of automatic address readers. The phosphors also can be used in a variety of other equipment where varying emission spectrums along with high efficiencies and rapid decay rates are desired. A relatively straightforward process is used to make the phosphors.

We claim:
1. A cathodoluminescent phosphor that decays in about 70 nanoseconds or less to 1/e of its original intensity and operates with high efficiency consisting essentially of a solid solution of yttrium aluminum oxide, yttrium gallium oxide and cerium ion having the formula

$$Y_{3-p}Ce_pAl_{5-q}Ga_qO_{12}$$

where $p$ is between about 0.03 and 0.50 and $q$ is between about 0.01 and 0.75.

2. The phosphor of claim 1 that emits light having a peak between about 5500 and 5750 angstroms in which $p$ is between about 0.09 and 0.3.

3. The phosphor of claim 2 that emits light having a peak at about 5650 angstrom units in which $p$ is about 0.15 and $q$ is about 0.25.

4. A process for manufacturing the cathodoluminescent phosphor of claim 1 comprising
preparing a dilute, intimately mixed aqueous solution of salts of the metals,
coprecipitating an intimate mixture of salts of the metals from said solution, and
firing the coprecipitate in a reducing atmosphere at a temperature of about 1300° C. to produce a uniform powder having an average particle size of less than one micron.

5. The process of claim 4 comprising repeating the firing step to reduce any afterglow of the phosphor.

6. The process of claim 4 in which the coprecipitating step is carried out by adding the solution to a buffered solution having a pH of about 7–7.5 simultaneously with a precipitating reagent to form hydroxides of the metals.

References Cited
UNITED STATES PATENTS

| | | | |
|---|---|---|---|
| 3,104,226 | 9/1963 | Struck | 252—301.4 P |
| 3,282,856 | 11/1966 | Borchardt | 252—301.4 R |

FOREIGN PATENTS

| | | | |
|---|---|---|---|
| 1,174,518 | 12/1969 | Great Britain | 252—301.4 R |

OTHER REFERENCES

Holloway:: Fluorescent Ion Interaction in Laser Crystals, Final Report, February 1968, prepared for Office of Naval Research, No. N00014–67–C–0266, appendix A and B, p. 2, FIGS. 3 and 4 and pp. 1 and 2 respectively, copy in A.U. 112.

Blasse et al.: Yellow Emitting $Y_3Al_5O_{12}$—$Ce^{3+}$— Applied Physics Letters, vol. 11, No. 2, July 15, 1967, pp. 53–54.

ROBERT D. EDMONDS, Primary Examiner